(12) United States Patent
Sherkin et al.

(10) Patent No.: US 10,637,920 B2
(45) Date of Patent: Apr. 28, 2020

(54) SYSTEM, METHOD, AND COMPUTER PROGRAM PRODUCT FOR PEER-TO-PEER EVENT ORDERING USING A TWO PART EVENT IDENTIFIER

(71) Applicant: DIGITAL 14 LLC, Abu Dhabi (AE)

(72) Inventors: Alexander Sherkin, Vaughan (CA); Michael Matovsky, Vaughan (CA)

(73) Assignee: DIGITAL 14 LLC, Abu Dhabi (AE)

( * ) Notice: Subject to any disclaimer, the term of this patent is extended or adjusted under 35 U.S.C. 154(b) by 0 days.

(21) Appl. No.: 15/681,237

(22) Filed: Aug. 18, 2017

(65) Prior Publication Data
US 2019/0058760 A1 Feb. 21, 2019

(51) Int. Cl.
*H04L 29/08* (2006.01)
*H04W 76/14* (2018.01)
*H04W 84/12* (2009.01)

(52) U.S. Cl.
CPC .......... *H04L 67/104* (2013.01); *H04W 76/14* (2018.02); *H04W 84/12* (2013.01)

(58) Field of Classification Search
None
See application file for complete search history.

(56) References Cited

U.S. PATENT DOCUMENTS

| | | | | |
|---|---|---|---|---|
| 2005/0086350 | A1* | 4/2005 | Mai | A63F 13/12 709/230 |
| 2005/0169219 | A1* | 8/2005 | Serpa | H04L 29/12254 370/338 |
| 2006/0168318 | A1* | 7/2006 | Twiss | H04L 45/00 709/238 |
| 2006/0218624 | A1 | 9/2006 | Ravikumar et al. | |
| 2007/0153710 | A1* | 7/2007 | Hopkins | H04L 43/50 370/254 |
| 2008/0046555 | A1* | 2/2008 | Datta | H04L 45/02 709/223 |
| 2008/0147854 | A1* | 6/2008 | Van Datta | A63F 13/12 709/224 |

(Continued)

OTHER PUBLICATIONS

Lamport, L., "Time, clocks, and the ordering of events in a distributed system," Communications of the ACM, vol. 21, No. 7, 1978, pp. 558-565.

(Continued)

*Primary Examiner* — Chirag G Shah
*Assistant Examiner* — Suk Jin Kang
(74) *Attorney, Agent, or Firm* — Zilka-Kotab, P.C.

(57) ABSTRACT

A system, method, and computer program product are provided for peer-to-peer event ordering using a two part event identifier. In use, a peer-to-peer communication channel is established by a first peer device with a second peer device. A current event identifier is initialized at the first peer device, and the second peer device initializes a different current event identifier at the second peer device. A plurality of events are communicated between the first peer device and the second peer device, where the events are each configured to include an event identifier that is the current event identifier of a sender of the event, and where the current event identifier includes two portions that are updated differently when sending and receiving events. Further, the events are ordered by the first peer device, using the event identifier included with each of the events.

20 Claims, 6 Drawing Sheets

(56) References Cited

U.S. PATENT DOCUMENTS

| | | | | |
|---|---|---|---|---|
| 2009/0222521 | A1* | 9/2009 | Petion | H04M 3/533 709/206 |
| 2010/0169961 | A1* | 7/2010 | Huh | H04L 41/069 726/9 |
| 2011/0029660 | A1* | 2/2011 | Hopkins | H04L 43/50 709/224 |
| 2011/0085529 | A1* | 4/2011 | Choi | H04L 29/08396 370/338 |
| 2012/0039453 | A1* | 2/2012 | Maenpaa | H04L 67/104 379/188 |
| 2012/0191849 | A1* | 7/2012 | Hopkins | H04L 43/50 709/224 |
| 2013/0294434 | A1* | 11/2013 | Lee | H04W 8/005 370/338 |
| 2013/0325772 | A1* | 12/2013 | Bader | G06F 9/542 706/20 |
| 2014/0130137 | A1* | 5/2014 | Baek | H04W 12/08 726/4 |
| 2014/0177537 | A1* | 6/2014 | Novak | H04W 76/14 370/329 |
| 2014/0177539 | A1* | 6/2014 | Novak | H04W 72/04 370/329 |
| 2014/0177540 | A1* | 6/2014 | Novak | H04W 72/042 370/329 |
| 2014/0187221 | A1* | 7/2014 | Ramachandran | H04W 4/50 455/418 |
| 2014/0379804 | A1* | 12/2014 | Wang | H04L 67/104 709/204 |
| 2015/0009981 | A1* | 1/2015 | Choi | H04L 29/08396 370/338 |
| 2015/0058375 | A1* | 2/2015 | Zhang | H04L 41/0604 707/770 |
| 2015/0127733 | A1* | 5/2015 | Ding | H04W 4/08 709/204 |
| 2016/0092517 | A1* | 3/2016 | Viel | G06F 16/24568 707/770 |
| 2016/0283312 | A1* | 9/2016 | Murrin | G06F 17/40 |
| 2017/0094226 | A1* | 3/2017 | Guzik | H04N 21/21 |
| 2017/0099174 | A1* | 4/2017 | Kim | H04W 76/14 |
| 2017/0195436 | A1 | 7/2017 | Grigoryan et al. | |
| 2018/0176293 | A1* | 6/2018 | Ding | H04W 4/08 |
| 2018/0189339 | A1* | 7/2018 | Ananthakrishnan | G06F 11/3006 |

OTHER PUBLICATIONS

International Search Report and Written Opinion from PCT Application No. PCT/IB2018/056115, dated Nov. 9, 2018.

* cited by examiner

SYSTEM, METHOD, AND COMPUTER PROGRAM PRODUCT FOR PEER-TO-PEER EVENT ORDERING USING A TWO PART EVENT IDENTIFIER

FIELD OF THE INVENTION

The present invention relates to peer-to-peer communications, and more particularly to ordering events exchanged between peer devices over a peer-to-peer communication channel.

BACKGROUND

In a peer-to-peer environment, two peer devices may exchange events end-to-end without relying on a central server. In this environment, the peer devices must have a process for unambiguously ordering these events (meaning that the event order should be the same on both peer devices). This process is complicated when little to no quality guarantees can be assumed about the communication channel between the two peers. For example, in some systems, the exchanged events may be lost, delayed, or arrive out of order.

Hence, in the peer-to-peer environment, there is no central server for the peer devices to rely on for ensuring correct event ordering. This peer-to-peer environment (as opposed to a communications environment relying on the central server) is generally preferred for security and scalability reasons. However, the peer-to-peer communication channel is unreliable including where events may be lost, delayed, or arrive out of order. In the presence of unreliable communication channel between two peer devices, it cannot be assumed that both peer devices have the same set of known (sent or received) events. To address this issue, event ordering solutions have been developed to attempt to ensure that both peer devices could order the events in the same way. However, these existing event ordering solutions have exhibited various limitations.

For example, one approach is to use absolute timestamps. Unfortunately, this approach is unreliable because the time configured on the two peer devices may differ, and so the event ordering by the two peer devices cannot be assumed to be the same.

Another approach is to use a counter for event identifiers (IDs), which traditionally has involved the use of Lamport timestamps. Lamport timestamps generally work well, but this approach produces the same timestamps for "concurrent" events which require further disambiguation based on an external deterministic method such as comparing process IDs. However, in reality, access to such disambiguation method may be limited. For example, relying on process IDs is not possible when the peer devices are running on different types of machines. Another problem with disambiguation is that it may be biased, e.g., if one peer device continuously "wins" the disambiguation process, the event ordering of "concurrent" events will be always the same, making the order biased.

There is thus a need for addressing these and/or other issues associated with the prior art.

SUMMARY

A system, method, and computer program product are provided for peer-to-peer event ordering using a two part event identifier. In use, a peer-to-peer communication channel is established by a first peer device with a second peer device. A current event identifier is initialized at the first peer device, and the second peer device initializes a current event identifier at the second peer device that is different from the current event identifier initialized at the first peer device. A plurality of events are communicated by the first peer device with the second peer device over the peer-to-peer communication channel, where the plurality of events are configured in accordance with a communication protocol that includes with each event of the plurality of events an event identifier that is the current event identifier of a sender of the event, and where the current event identifier includes two portions that are updated differently when sending and receiving events. Further, the events in the plurality of events are ordered by the first peer device, using the event identifier included with each of the events in the plurality of events.

DETAILED DESCRIPTION

Figure 1:
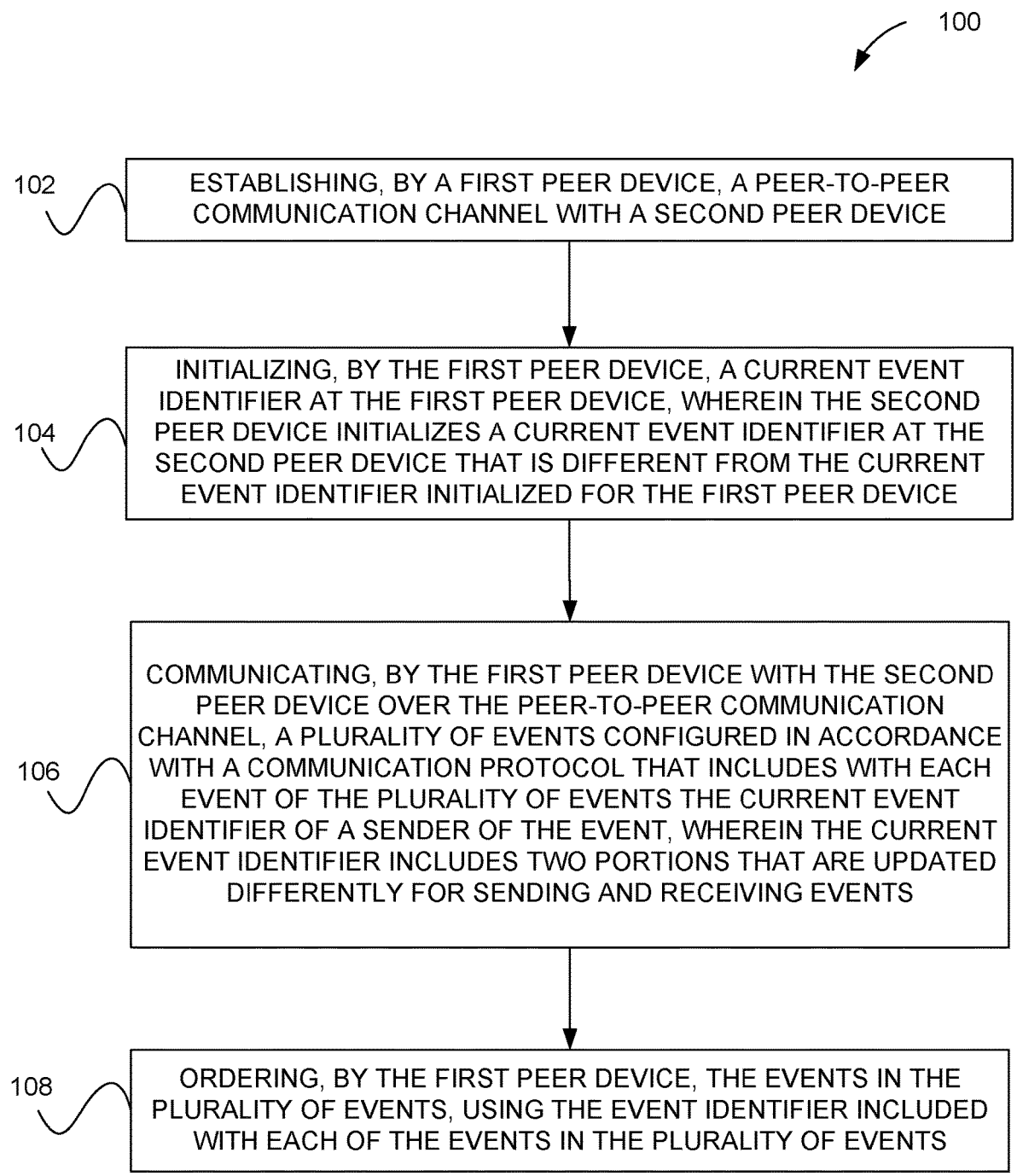
FIG. 1 shows a method for peer-to-peer event ordering using a two part event identifier, in accordance with one embodiment.

FIG. 1 shows a method 100 for peer-to-peer event ordering using a two part event identifier, in accordance with one embodiment.

As shown in operation 102, a peer-to-peer communication channel is established by a first peer device with a second peer device. In the context of the present description, a peer device, including the first peer device and the second peer device, is any device capable of communicating with at least one other peer device through a peer-to-peer communication channel. For example, the peer device may be any of the end user devices described below with reference to FIG. 6.

Further, the peer-to-peer communication channel may be any medium through which the first peer device and the second peer device can directly communicate. In other words, the peer-to-peer communication channel enables the first peer device and the second peer device to communicate without use of an intermediary device (e.g. a central server). For example, the peer-to-peer communication channel may be a Wi-Fi communication channel established between the first peer device and the second peer device, or a communication channel established between the first peer device and the second peer device using any other network technology (e.g. such as those described below with reference to FIG. 6).

It should be noted that the peer-to-peer communication channel may be established by the first peer device with the second peer device in any well-known manner, for example by the first peer device establishing the peer-to-peer communication channel on a network and the second peer device recognizing the peer-to-peer communication channel and connecting to the same. Optionally, the peer-to-peer communication channel may or may not have security features enabled, as configured by the first peer device when establishing the peer-to-peer communication channel on the network. By establishing the peer-to-peer communication channel, a peer-to-peer connection may be created between the first peer device and the second peer device.

In one embodiment, establishing the peer-to-peer communication channel by the first peer device with the second peer device may include performing, by the first peer device, a peer-to-peer handshake process with the second peer device. The peer-to-peer handshake process may be utilized to establish rules for communication between the first peer device and the second peer device, such as a communication protocol to be used by the first peer device and the second peer device when communicating with one another over the peer-to-peer communication channel. Details regarding the communication protocol used by the first peer device and the second peer device when communicating with one another over the peer-to-peer communication channel are set forth below.

Additionally, as shown in operation 104, a current event identifier is initialized at the first peer device, and the second peer device initializes a current event identifier at the second peer device that is different from the current event identifier initialized at the first peer device. The current event identifier for each of the first peer device and the second peer device may be determined through the peer-to-peer handshake process mentioned above, and optionally may be initialized in memory of the respective peer device.

In the context of the present description, an event identifier is a unique identifier that is included with an event (e.g. message) when communicating the event between the first peer device and the second peer device over the peer-to-peer communication channel. The current event identifier at each of the first peer device and the second peer device is the event identifier that is included by the peer device with an event when sending that event over the peer-to-peer communication channel. The current event identifier at each of the first peer device and the second peer device is periodically updated, as described in more detail below, to ensure that the event identifier included with each event communicated over the peer-to-peer communication channel is unique.

The event identifier may be in any desired format, but as described below has at least a first portion and a second portion that can be independently updated. In one embodiment, which is described throughout the remaining figures by way of example only, the event identifier may be in a format [x,y], where x is the first portion and/or may represent the (e.g. 4) most significant bytes (MSB) of the event identifier, and where y is the second portion and/or may represent the (e.g. 4) least significant bytes (LSB) of the event identifier. Further to this embodiment, and again by way of example only, x may be a first integer and y may be a second integer. Thus, in one implementation, the current event identifier initialized for the first peer device may be [0,0], and the current event identifier initialized for the second peer device may be [1,0].

Still yet, as shown in operation 106, a plurality of events are communicated by the first peer device with the second peer device over the peer-to-peer communication channel. In operation 106, and as described above, the events are configured in accordance with a communication protocol that includes with each event of the plurality of events an event identifier that is the current event identifier of a sender of the event. This communication protocol may be agreed upon by the first and second peer devices when establishing the peer-to-peer communication channel (e.g. during the aforementioned peer-to-peer handshaking process). As also mentioned above, the current event identifier of each of the first and second peer devices includes two portions that are periodically updated by the respective peer device, and in particular that are updated differently by the respective peer device when sending and receiving events. By each of the first and second peer devices updating their respective current event identifier in this manner, it may be ensured that the event identifier included with an event when communicating the event over the peer-to-peer communication channel is unique. Use of the event identifiers may make the communication protocol a secure communication protocol.

In one embodiment, communicating, by the first peer device with the second peer device over the peer-to-peer communication channel, the plurality of events may include the first peer device sending an event to the second peer device over the peer-to-peer communication channel. For example, the first peer device may request to send an event of the plurality of events to the second peer device, such that the first peer device is the sender of the event. The first peer device may then include as the event identifier with the event the current event identifier at the first peer device. Finally, the first peer device may send to the second peer device over the peer-to-peer communication channel the event. Responsive to sending the event to the second peer device (which may be at the same time or a later time than the sending), the first peer device may increment the second portion of the current event identifier at the first peer device. The increment may be any step to increase the second portion of the current event identifier at the first peer device, as preconfigured by the communication protocol. For example, the increment may be 1.

In another embodiment, communicating, by the first peer device with the second peer device over the peer-to-peer communication channel, the plurality of events may include the first peer device receiving an event from second peer device over the peer-to-peer communication channel. For example, the first peer device may receive an event from the second peer device, such that the second peer device is the sender of the event. Responsive to receiving the event from the second peer device (which may be at the same time or a later time than the sending), the first peer device may set the event identifier included with the event as the current event identifier at the first peer device. The first peer device may then increment the first portion of the current event identifier (e.g. by 1 or any other value preconfigured by the communication protocol) at the first peer device and set the second portion of the current event identifier at the first peer device to a default value (e.g. 0 or any other value preconfigured by the communication protocol).

Moreover, as shown in operation 108, the events in the plurality of events are ordered by the first peer device, using the event identifier included with each of the events in the plurality of events. The events may be ordered by the first peer device for each newly received event by the first peer device and for each newly sent event by the first peer device. The ordering may be performed using an algorithm stored on the first peer device. This algorithm may be included with the communication protocol utilized by the first and second peer devices, and may order the events sequentially (e.g. by time of transmission). As noted above, a unique event identifier is included with each of the events, which may enable the first peer device to order the events according to the event identifiers included therewith.

In one embodiment, the ordering in operation 108 may include first, numerically ordering the events based on the first portion of the event identifier, and second, numerically ordering any events with a same value for the first portion of the event identifier based on the second portion of the event identifier. In the embodiment where the first and second portions of the event identifiers are incremented over time, a greater value may be associated with a later event. Table 1 illustrates one example of the algorithm that may be used to determine the order of two events, namely which event of the two events occurred earlier. Of course, this algorithm is set forth for illustrative purposes only and should not be construed as limiting in any manner.

Table 1

To compare ID1=[x1,y1] of Event1 to ID2=[x2,y2] of Event 2.
1. If x1>x2, then ID1>ID2 and Event1 occurred later than Event2
2. else if x1<x2, then ID1<ID2 and Event1 occurred earlier than Event2
3. else
  a. if y1>y2, then ID1>ID2 and Event1 occurred later than Event2
  b. else if y1<y2, then ID1<ID2 and Event1 occurred earlier than Event2
  c. else ID1==ID2 and Event1 occurred at a same time as Event 2

It should be noted that while the method 100 is described above with reference to the first peer device, the second peer device may operate in the same manner to send/receive events and to order the same (e.g. in accordance with the communication protocol). To this end, by ensuring that each event has a unique event identifier, and that ordering of the events can be accomplished using the event identifiers, an unambiguous event ordering may be accomplished by the peer devices without requiring access to external disambiguation logic (e.g. at a central server). Moreover, further handshaking processes beyond an initial establishment of the peer-to-peer communication channel that might otherwise be required to resolve event order ambiguities may be avoided.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
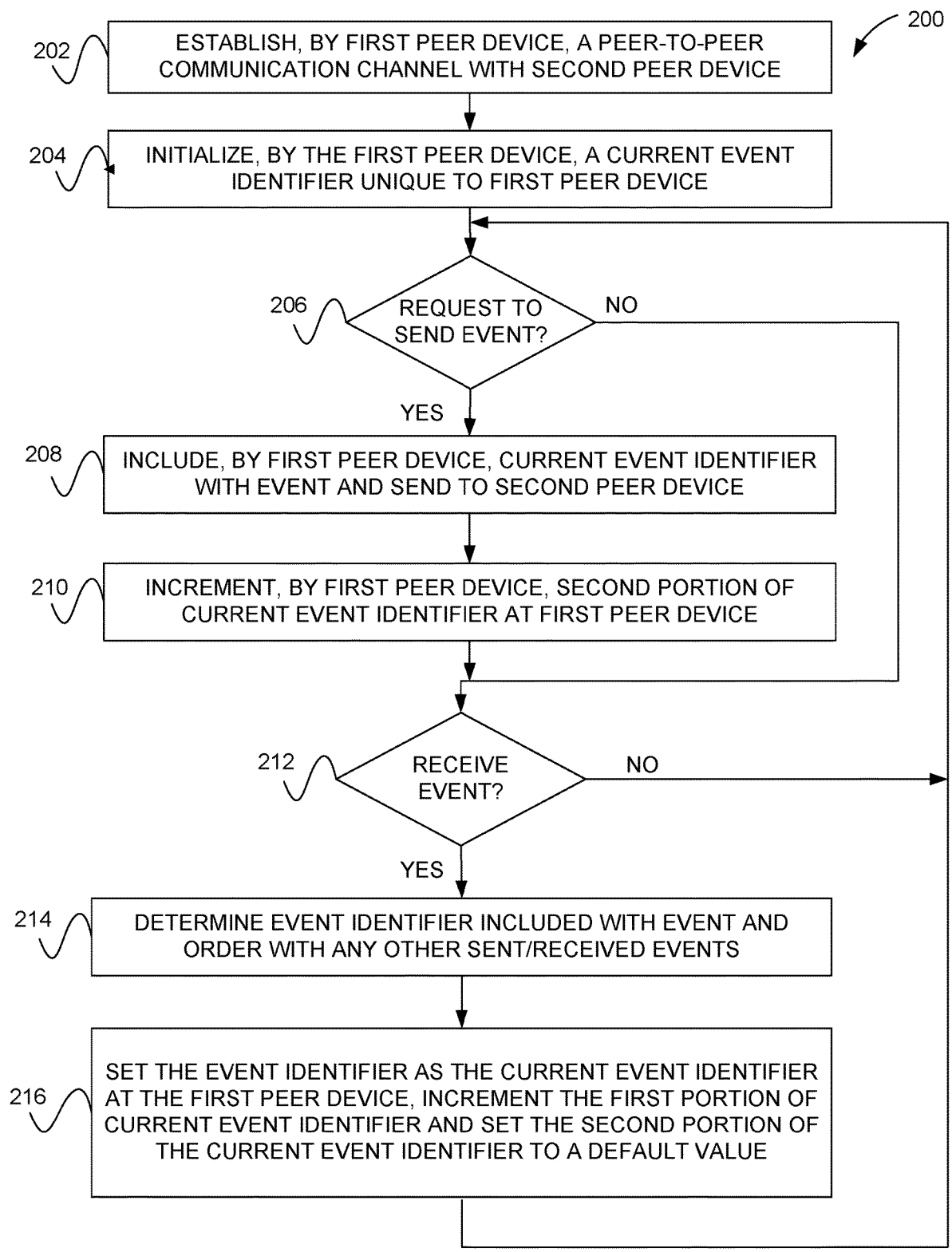
FIG. 2 shows a method for peer-to-peer event ordering of sent and received events using a two part event identifier, in accordance with another embodiment.

FIG. 2 shows a method 200 for peer-to-peer event ordering of sent and received events using a two part event identifier, in accordance with another embodiment. As an option, the method 200 may be carried out in the context of the method 100 of FIG. 1 (e.g. by the first peer device mentioned with respect to FIG. 1). Of course, however, the method 200 may be carried out in any desired context. It should also be noted that the aforementioned definitions may apply during the present description.

As shown in operation 202, a peer-to-peer communication channel is established by a first peer device with a second peer device. In operation 204, a current event identifier is unique to the first peer device is initialized by the first peer device. For example, the current event identifier may be initialized in memory of the first peer device, and may be determined in accordance with a handshaking process performed with the second peer device during operation 202.

In decision 206, it is determined whether the first peer device requests to send an event to the second peer device over the peer-to-peer communication channel. This request may be initiated by a user of the first peer device or automatically by an application executing on the first peer device. When it is determined in decision 206 that the first peer device requests to send the event, the first peer device includes with the event as an event identifier the current event identifier at the first peer device, and further sends the event with the event identifier to the second peer device (see operation 208). The first peer device then increments the second portion of the current event identifier at the first peer device, as shown in operation 210. The method 200 then proceeds to decision 212.

When it is determined that the first peer device does not request to send the event, the method 200 proceeds to decision 212. In decision 212, it is determined whether the first peer device receives an event from the second peer device over the peer-to-peer communication channel. When it is determined in decision 212 that the first peer device receives an event, the event identifier included with the event is determined and the event is ordered with any other previously sent/received events using the event identifier (see operation 214).

Further, in operation 216, first peer device sets the event identifier included with the event as the current event identifier at the first peer device, increments the first portion of the current event identifier at the first peer device, and sets the second portion of the current event identifier at the first peer device to a default value. The method 200 then returns to decision 212 to continuously process events sent and received by the first peer device. When it is determined in decision 212 that the first peer device does not receive an event, the method returns to decision 212. The method 200 may terminate when the peer-to-peer communication channel is removed.

It should be noted that while the method 200 shows a particular order for events that are sent and received, these operations may be implemented in any other sequence or in parallel, as desired. Furthermore, while the method 200 is described with respect to operations of the first peer device, the method 200 may similarly be implemented by the second peer device.

Figure 3:
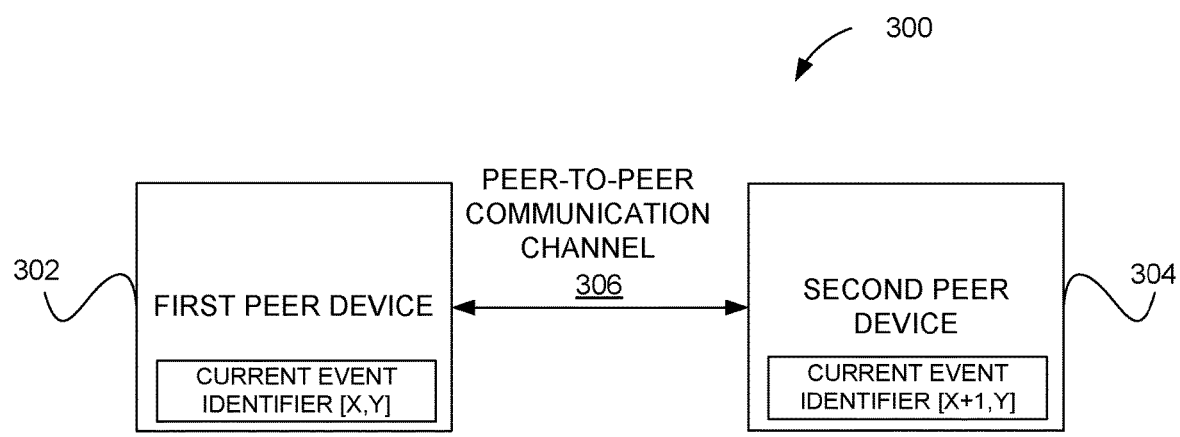
FIG. 3 shows a system for peer-to-peer communications, in accordance with yet another embodiment.

FIG. 3 shows a system 300 for peer-to-peer communications, in accordance with yet another embodiment. As an option, the system 300 may be implemented in the context of the method 100 of FIG. 1. Of course, however, the system 300 may be implemented in any desired context. It should also be noted that the aforementioned definitions may apply during the present description.

As shown, the system 300 includes a first peer device 302 and a second peer device 304 in communication with one another over a peer-to-peer communication channel 306. The first peer device 302 initializes a current event identifier [x,y] in its memory. The second peer device 304 initializes a current event identifier [x+1,y] in its memory. The current event identifiers initialized by the first peer device 302 and the second peer device 304 may be determined when the peer-to-peer communication channel 306 is established.

The first peer device 302 and the second peer device 304 send events to one another over the peer-to-peer communication channel 306, and configure the events in accordance with a communication protocol to include with each event an event identifier that is the current event identifier of the sender of the event. The current event identifiers at the first peer device 302 and the second peer device 304 are updated by the first peer device 302 and the second peer device 304 differently when sending and receiving the events. Further, the first peer device 302 and the second peer device 304 order the sent and received events using the event identifiers included with the events.

Figure 4:
FIG. 4 shows a peer-to-peer event, in accordance with still yet another embodiment.

FIG. 4 shows a peer-to-peer event 400, in accordance with still yet another embodiment. As an option, the peer-to-peer event 400 may be implemented in the context of the method 100 of FIG. 1. For example, the peer-to-peer event 400 may be communicated over the peer-to-peer communication channel between the first peer device and the second peer device. Of course, however, the peer-to-peer event 400 may be implemented in any desired context. It should also be noted that the aforementioned definitions may apply during the present description.

As shown, the peer-to-peer event 400 includes a first portion 402 and a second portion 404. The second portion 404 is the event itself. The first portion 402 is the event identifier, which as shown by way of example takes the format [x,y]. In one embodiment, the first portion 402 may be a header of the peer-to-peer event 400 and the second portion 404 may be a body of the peer-to-peer event 400. Optionally, the peer-to-peer event 400 may be encrypted in accordance with any security measures employed by the communication protocol being used.

Figure 5:
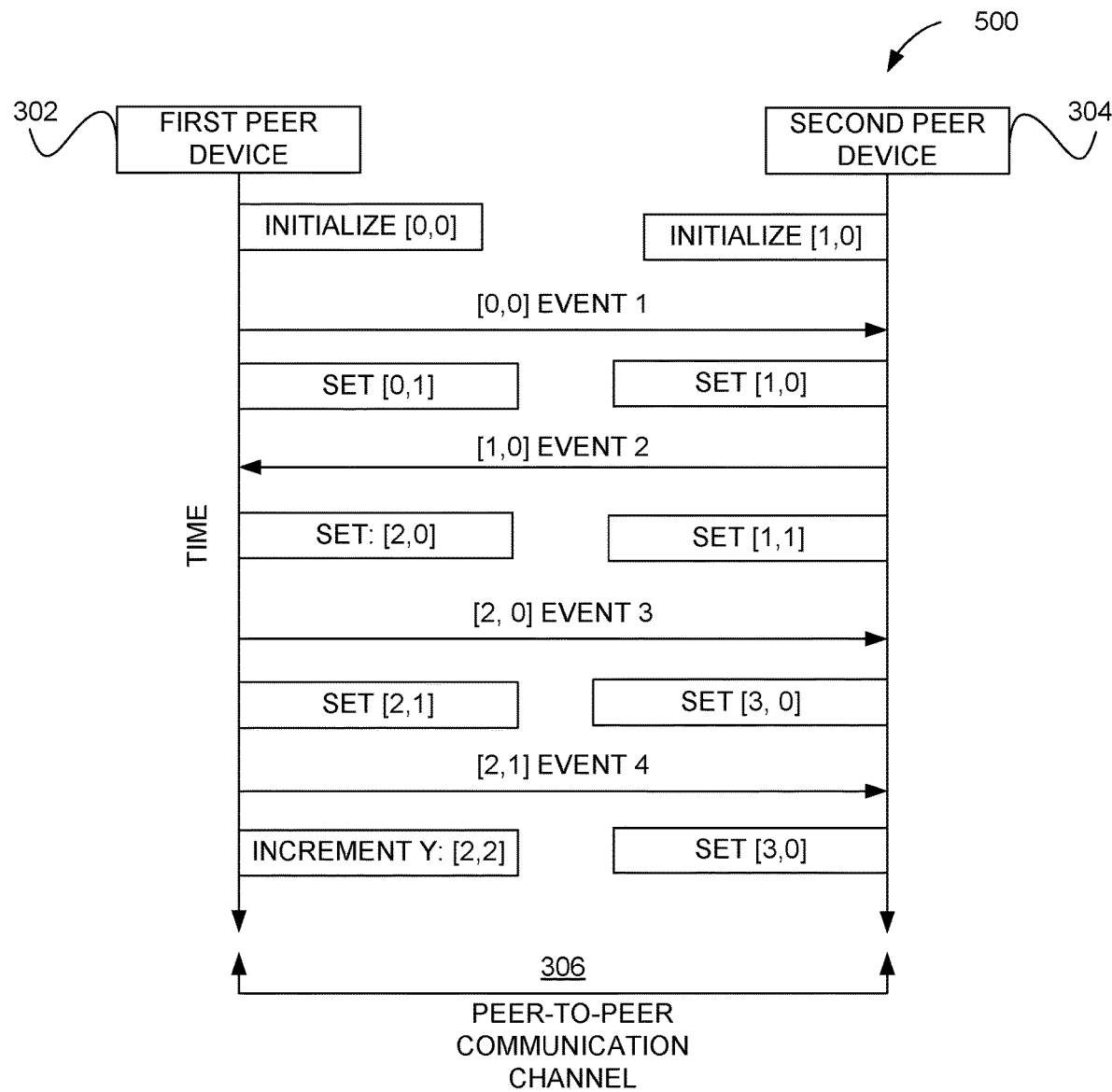
FIG. 5 shows a flow of peer-to-peer communication system that uses a two part event identifier, accordance with the system of FIG. 3.

FIG. 5 shows a flow of peer-to-peer communication system 500 that uses a two part event identifier, in accordance with the system 300 of FIG. 3. Of course, it should be noted that the system 500 may be implemented in the context of the other figures described herein as well. It should also be noted that the aforementioned definitions may apply during the present description.

As shown, a first peer device 302 and a second peer device 304 are in communication with one another over a peer-to-peer communication channel 306. The operations of the first peer device 302 and the second peer device 304 as well as the events communicated therebetween are shown in a time sequential order. At a first time, the first peer device 302 initializes a current event identifier [0,0] in its memory, and the second peer device 304 initializes a current event identifier [1,0] in its memory. Of course, this initialization by the first peer device 302 and the second peer device 304 may not necessarily be performed at an exact same time, but in any case are performed prior to events being communicated over the peer-to-peer communication channel 306.

As time progresses, the first peer device 302 sends a first event (EVENT1) with its current event identifier [0,0] as the event identifier for the first event. Responsive to sending the first event, the first peer device 302 increments the second portion of its current event identifier to become [0,1]. Upon receipt of the first event, the second peer device 304 sets its current event identifier to the event identifier included with the first event, then increments the first portion of its current event identifier and sets the second portion of its current event identifier to default value 0, such that its current event identifier is set to [1,0] as shown.

After the first event, the second peer device 304 sends a second event (EVENT2) with its current event identifier [1,0] as the event identifier for the second event. Responsive to sending the second event, the second peer device 304 increments the second portion of its current event identifier to become [1,1]. Upon receipt of the second event, the first peer device 302 sets its current event identifier to the event identifier included with the first event, then increments the first portion of its current event identifier and sets the second portion of its current event identifier to default value 0, such that its current event identifier is set to [2,0] as shown.

After the second event, the first peer device 302 sends a third event (EVENT3) with its current event identifier [2,0] as the event identifier for the third event. Responsive to sending the first event, the first peer device 302 increments the second portion of its current event identifier to become [2,1]. Upon receipt of the third event, the second peer device 304 sets its current event identifier to the event identifier included with the first event, then increments the first portion of its current event identifier and sets the second portion of its current event identifier to default value 0, such that its current event identifier is set to [3,0] as shown.

After the third event, the first peer device 302 sends a fourth event (EVENT4) with its current event identifier [2,1] as the event identifier for the fourth event. Responsive to sending the fourth event, the first peer device 302 increments the second portion of its current event identifier to become [2,2]. Upon receipt of the fourth event, the second peer device 304 sets its current event identifier to the event identifier included with the first event, then increments the first portion of its current event identifier and sets the second portion of its current event identifier to default value 0, such that its current event identifier is set to [3,0] as shown.

The first peer device 302 and the second peer device 304 may continue to communicate events to one another using the above described communication protocol, with updating their respective current event identifiers upon sending and receiving of the events. It should be noted that it is not necessary for the first peer device 302 and the second peer device 304 to take turns communicating events, and that either of the peer devices 302, 304 may send a continuous (uninterrupted) sequence of events while still maintaining uniqueness of the event identifiers included therewith.

Figure 6:
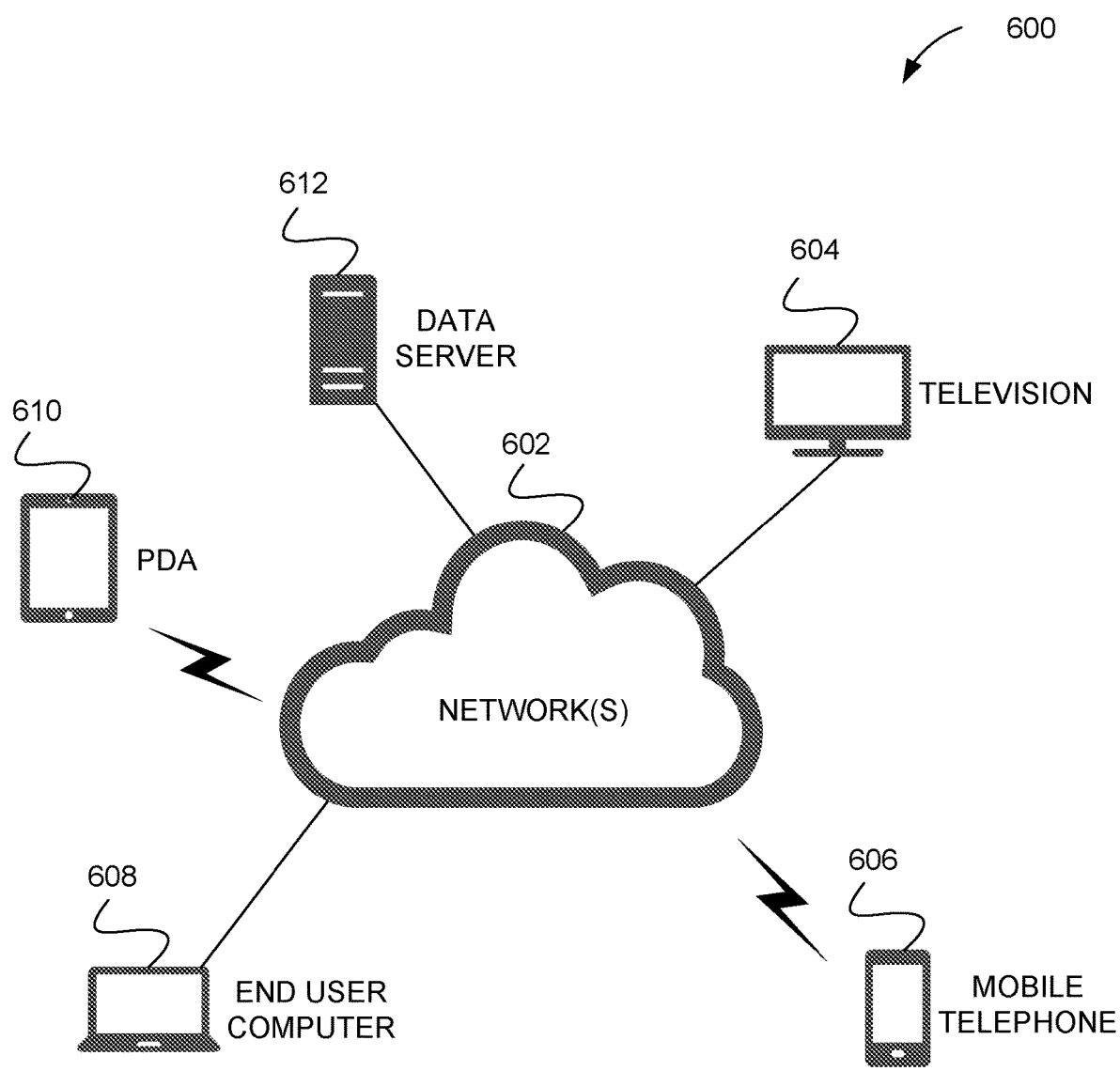
FIG. 6 illustrates a network architecture, in accordance with one embodiment.

FIG. 6 illustrates a network architecture 600, in accordance with one embodiment. As shown, at least one network 602 is provided. In various embodiments, any one or more components/features set forth during the description of any previous figure(s) may be implemented in connection with any one or more of the components of the at least one network 602.

In the context of the present network architecture 600, the network 602 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 602 may be provided.

Coupled to the network 602 is a plurality of devices. For example, a server computer 612 and an end user computer 608 may be coupled to the network 602 for communication purposes. Such end user computer 608 may include a desktop computer, lap-top computer, and/or any other type of logic. Still yet, various other devices may be coupled to the network 602 including a personal digital assistant (PDA) device 610, a mobile phone device 606, a television 604, etc.

Figure 7:
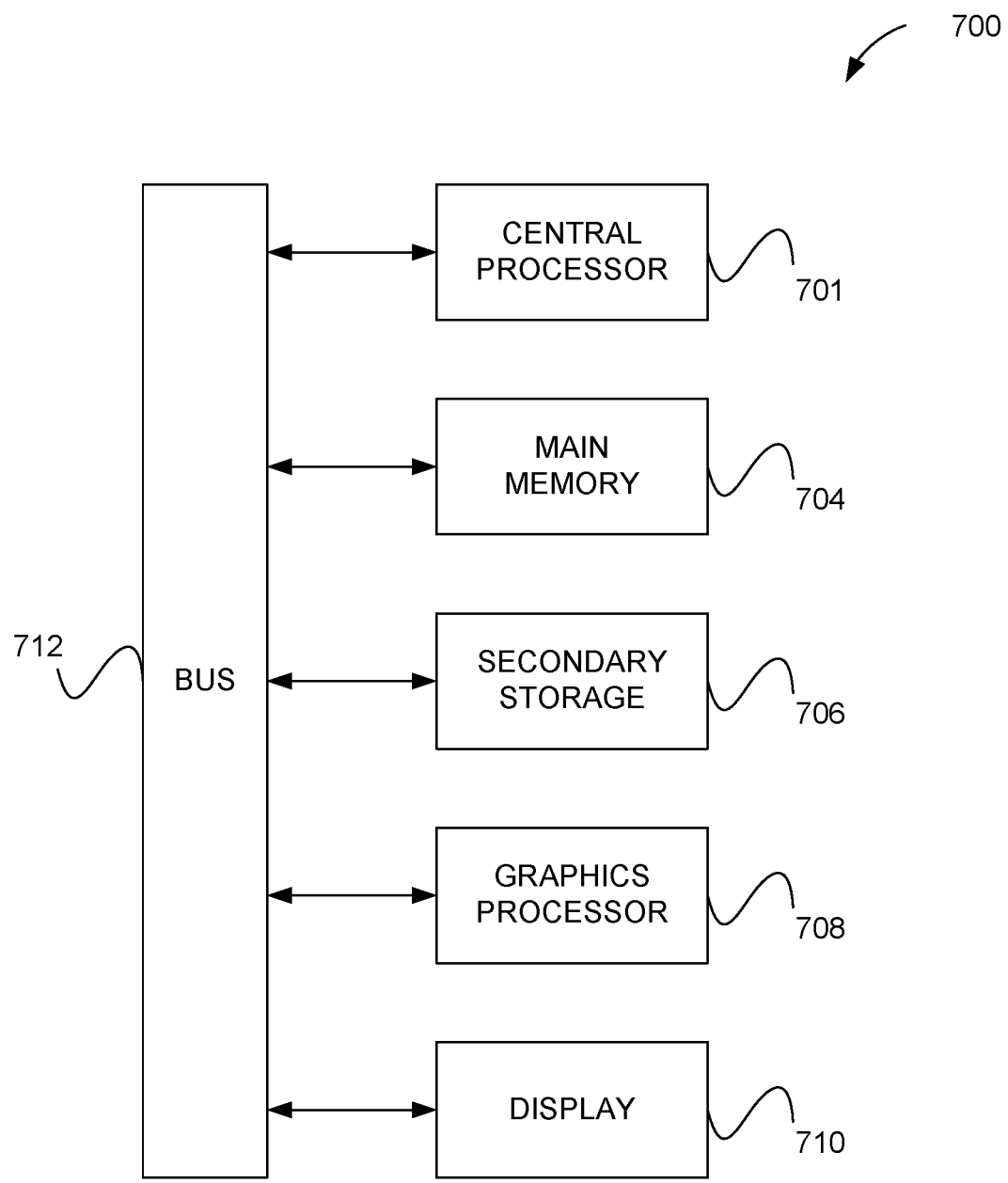
FIG. 7 illustrates an exemplary system, in accordance with one embodiment.

FIG. 7 illustrates an exemplary system 700, in accordance with one embodiment. As an option, the system 700 may be implemented in the context of any of the devices of the network architecture 600 of FIG. 6. However, it is to be appreciated that the system 700 may be implemented in any desired environment.

As shown, a system 700 is provided including at least one central processor 702 which is connected to a bus 712. The system 700 also includes main memory 704 [e.g., hard disk drive, solid state drive, random access memory (RAM), etc.]. The system 700 also includes a graphics processor 708 and a display 710.

The system 700 may also include a secondary storage 706. The secondary storage 706 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 704, the secondary storage 706, and/or any other memory, for that matter. Such computer programs, when executed, enable the system 700 to perform various functions (as set forth above, for example). Memory 704, secondary storage 706 and/or any other storage are possible examples of non-transitory computer-readable media.

In one embodiment, means in the form of the processor 702 (and/or different means corresponding to different components thereof) executes instructions in the memory 704 or in the secondary storage 706 to: establish, by a first peer device, a peer-to-peer communication channel with a second peer device; to initialize, by the first peer device, a current event identifier at the first peer device, wherein the second peer device initializes a current event identifier at the second peer device that is different from the current event identifier initialized at the first peer device; to communicate, by the first peer device with the second peer device over the peer-to-peer communication channel, a plurality of events configured in accordance with a communication protocol that includes with each event of the plurality of events an event identifier that is the current event identifier of a sender of the event, wherein the current event identifier includes two portions that are updated differently when sending and receiving events; and to order, by the first peer device, the events in the plurality of events, using the event identifier included with each of the events in the plurality of events.

Optionally, in any of the preceding embodiments, the peer-to-peer communication channel enables the first peer device and the second peer device to communicate without use of an intermediary device.

Optionally, in any of the preceding embodiments, establishing, by the first peer device, the peer-to-peer communication channel with the second peer device includes: performing, by the first peer device, a peer-to-peer handshake process with the second peer device. As a further option, the peer-to-peer handshake process determines the current event identifier for the first peer device and the current event identifier for the second peer device.

Optionally, in any of the preceding embodiments, communicating, by the first peer device with the second peer device over the peer-to-peer communication channel, the plurality of events includes: requesting, by the first peer device, to send an event of the plurality of events to the second peer device, such that the first peer device is the sender of the event; including as the event identifier with the event of the plurality of events, by the first peer device, the current event identifier at the first peer device; sending, by the first peer device to the second peer device, over the peer-to-peer communication channel, the event of the plurality of events with the included event identifier; responsive to sending the event to the second peer device, incrementing, by the first peer device, the second portion of the current event identifier at the first peer device.

Optionally, in any of the preceding embodiments, communicating, by the first peer device with the second peer device over the peer-to-peer communication channel, the plurality of events includes: receiving, by the first peer device, an event of the plurality of events from the second peer device, such that the second peer device is the sender of the event; responsive to receiving the event from the second peer device, setting, by the first peer device, the event identifier included with the event as the current event identifier at the first peer device, and incrementing, by the first peer device, the first portion of the current event identifier at the first peer device and setting the second portion of the current event identifier at the first peer device to a default value.

Optionally, in any of the preceding embodiments, the event identifier is in a format [x,y], wherein x is the first portion and y is the second portion. As a further option, x is a first integer and y is a second integer. As another option, x represents the most significant bytes (MSB) of the event identifier and y represents the least significant bytes (LSB) of the event identifier. As yet another option, the current event identifier initialized for the first peer device is [0,0], and wherein the current event identifier initialized for the second peer device is [1,0].

Optionally, in any of the preceding embodiments, ordering, by the first peer device, the events in the plurality of events, using the event identifier included with each of the events in the plurality of events includes: first, numerically ordering the events based on the first portion of the event identifier; and second, numerically ordering any events with a same value for the first portion of the event identifier based on the second portion of the event identifier. As another option, a greater value is associated with a later event.

Optionally, in any of the preceding embodiments, a unique event identifier is included with each event of the plurality of events.

It is noted that the techniques described herein, in an aspect, are embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media are included which may store data that is accessible by a computer, such as magnetic cassettes, flash memory cards, digital video disks, Bernoulli cartridges, random access memory (RAM), read-only memory (ROM), and the like.

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that various of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein include the one or more modes known to the inventor for carrying out the claimed subject matter. It is to be appreciated that variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A method, comprising:

establishing, by a first peer device, a peer-to-peer communication channel with a second peer device;

initializing, by the first peer device, a current first peer event identifier at the first peer device, wherein the current first peer event identifier at the first peer device includes a first value that is updated each time the first peer device sends an event and a second value that is updated each time the first peer device receives an event, wherein the second peer device initializes a current second peer event identifier at the second peer device that is different from the current first peer event identifier initialized at the first peer device, and wherein the current second peer event identifier at the second peer device includes a first value that is updated each time the second peer device sends an event and a second value that is updated each time the second peer device receives an event;

communicating, between the first peer device and the second peer device over the peer-to-peer communication channel, a plurality of events configured in accordance with a communication protocol that includes with each event of the plurality of events an event identifier that is the current event identifier of a sender of the event, the communicating including:

for each event of the plurality of events sent by the first peer device to the second peer device, sending, with the event, the current first peer event identifier of the first peer device, and for each additional event of the plurality of events received by the first peer device from the second peer device, receiving, with the additional event, the current second peer event identifier of the second peer device; and ordering, by the first peer device, the events in the plurality of events, using the event identifier included with each of the events in the plurality of events.

2. The method of claim 1, wherein the peer-to-peer communication channel enables the first peer device and the second peer device to communicate without use of an intermediary device.

3. The method of claim 1, wherein establishing, by the first peer device, the peer-to-peer communication channel with the second peer device includes:

performing, by the first peer device, a peer-to-peer handshake process with the second peer device.

4. The method of claim 3, wherein the peer-to-peer handshake process determines the current first peer event identifier at the first peer device and the current second peer event identifier at the second peer device.

5. The method of claim 1, wherein communicating, between the first peer device and the second peer device over the peer-to-peer communication channel, the plurality of events includes:

requesting, by the first peer device, to send an event of the plurality of events to the second peer device, such that the first peer device is the sender of the event;

including as the event identifier with the event of the plurality of events, by the first peer device, the current first peer event identifier at the first peer device;

sending, by the first peer device to the second peer device, over the peer-to-peer communication channel, the event of the plurality of events with the included event identifier;

responsive to sending the event to the second peer device, incrementing, by the first peer device, the second value of the current first peer event identifier at the first peer device.

6. The method of claim 1, wherein communicating, between the first peer device and the second peer device over the peer-to-peer communication channel, the plurality of events includes:

receiving, by the first peer device, an additional event of the plurality of events from the second peer device, such that the second peer device is the sender of the event;

responsive to receiving the event from the second peer device, setting, by the first peer device, the event identifier included with the event as the current first peer event identifier at the first peer device, and incrementing, by the first peer device, the first value of the current first peer event identifier at the first peer device and setting the second value of the current first peer event identifier at the first peer device to a default value.

7. The method of claim 1, wherein the event identifier is in a format [x,y], wherein x is the first value and y is the second value.

8. The method of claim 7, wherein x is a first integer and y is a second integer.

9. The method of claim 8, wherein x represents the most significant bytes (MSB) of the event identifier and y represents the least significant bytes (LSB) of the event identifier.

10. The method of claim 8, wherein the current first peer event identifier initialized for the first peer device is [0,0], and wherein the current second peer event identifier initialized for the second peer device is [1,0].

11. The method of claim 1, wherein ordering, by the first peer device, the events in the plurality of events, using the event identifier included with each of the events in the plurality of events includes:

first, numerically ordering the events based on the first value of the event identifier; and second, numerically ordering any events with a same value for the first value of the event identifier based on the second value of the event identifier.

12. The method of claim 11, wherein a greater value is associated with a later event.

13. The method of claim 1, wherein a unique event identifier is included with each event of the plurality of events.

14. A non-transitory computer readable medium storing computer code executable by a processor to perform a method comprising:

establishing, by a first peer device, a peer-to-peer communication channel with a second peer device;

initializing, by the first peer device, a current first peer event identifier at the first peer device, wherein the current first peer event identifier at the first peer device includes a first value that is updated each time the first peer device sends an event and a second value that is updated each time the first peer device receives an event, wherein the second peer device initializes a current second peer event identifier at the second peer device that is different from the current first peer event identifier initialized at the first peer device, and wherein the current second peer event identifier at the second peer device includes a first value that is updated each time the second peer device sends an event and a second value that is updated each time the second peer device receives an event;

communicating, between the first peer device and the second peer device over the peer-to-peer communication channel, a plurality of events configured in accordance with a communication protocol that includes with each event of the plurality of events an event identifier that is the current event identifier of a sender of the event, the communicating including:

for each event of the plurality of events sent by the first peer device to the second peer device, sending, with the event, the current first peer event identifier of the first peer device, and for each additional event of the plurality of events received by the first peer device from the second peer device, receiving, with the additional event, the current second peer event identifier of the second peer device; and ordering, by the first peer device, the events in the plurality of events, using the event identifier included with each of the events in the plurality of events.

15. The non-transitory computer readable medium of claim 14, wherein establishing, by the first peer device, the peer-to-peer communication channel with the second peer device includes:

performing, by the first peer device, a peer-to-peer handshake process with the second peer device.

16. The non-transitory computer readable medium of claim 15, wherein the peer-to-peer handshake process determines the current first peer event identifier at the first peer device and the current second peer event identifier at the second peer device.

17. The non-transitory computer readable medium of claim 14, wherein communicating, between the first peer device and the second peer device over the peer-to-peer communication channel, the plurality of events includes:
  requesting, by the first peer device, to send an event of the plurality of events to the second peer device, such that the first peer device is the sender of the event;
  including as the event identifier with the event of the plurality of events, by the first peer device, the current first peer event identifier at the first peer device;
  sending, by the first peer device to the second peer device, over the peer-to-peer communication channel, the event of the plurality of events with the included event identifier;
  responsive to sending the event to the second peer device, incrementing, by the first peer device, the second value of the current first peer event identifier at the first peer device.

18. The non-transitory computer readable medium of claim 14, wherein communicating, between the first peer device and the second peer device over the peer-to-peer communication channel, the plurality of events includes:
  receiving, by the first peer device, an event of the plurality of events from the second peer device, such that the second peer device is the sender of the event;
  responsive to receiving the event from the second peer device, setting, by the first peer device, the event identifier included with the event as the current first peer event identifier at the first peer device, and incrementing, by the first peer device, the first value of the current first peer event identifier at the first peer device and setting the second value of the current first peer event identifier at the first peer device to a default value.

19. An apparatus, comprising:
a computer processor of a first peer device for:
  establishing a peer-to-peer communication channel with a second peer device;
  initializing, by the first peer device, a current first peer event identifier at the first peer device, wherein the current first peer event identifier at the first peer device includes a first value that is updated each time the first peer device sends an event and a second value that is updated each time the first peer device receives an event,
  wherein the second peer device initializes a current second peer event identifier at the second peer device that is different from the current first peer event identifier initialized at the first peer device, and wherein the current second peer event identifier at the second peer device includes a first value that is updated each time the second peer device sends an event and a second value that is updated each time the second peer device receives an event;
  communicating, with the second peer device over the peer-to-peer communication channel, a plurality of events configured in accordance with a communication protocol that includes with each event of the plurality of events an event identifier that is the current event identifier of a sender of the event, the communicating including:
    for each event of the plurality of events sent by the first peer device to the second peer device, sending, with the event, the current first peer event identifier of the first peer device, and
    for each additional event of the plurality of events received by the first peer device from the second peer device, receiving, with the additional event, the current second peer event identifier of the second peer device; and
  ordering the events in the plurality of events, using the event identifier included with each of the events in the plurality of events.

20. The apparatus of claim 19, wherein the event identifiers are utilized to make the communication protocol a secure communication protocol.

* * * * *